United States Patent
Ergun et al.

(10) Patent No.: US 9,660,466 B2
(45) Date of Patent: *May 23, 2017

(54) TABLET AND MONITOR SUPPORT SYSTEMS

(71) Applicant: Ergotron, Inc., St. Paul, MN (US)

(72) Inventors: Mustafa A. Ergun, Plymouth, MN (US); Shaun Christopher Lindblad, Lino Lakes, MN (US); William Dale Tischer, Shoreview, MN (US)

(73) Assignee: Ergotron, Inc., St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/921,499

(22) Filed: Oct. 23, 2015

(65) Prior Publication Data
US 2016/0037910 A1    Feb. 11, 2016

Related U.S. Application Data (63) Continuation of application No. 13/650,616, filed on Oct. 12, 2012, now Pat. No. 9,207,722.

(60) Provisional application No. 61/547,257, filed on Oct. 14, 2011, provisional application No. 61/553,620, filed on Oct. 31, 2011, provisional application No. 61/590,032, filed on Jan. 24, 2012.

(51) Int. Cl.
| | |
|---|---|
| *G06F 1/18* | (2006.01) |
| *H02J 7/00* | (2006.01) |
| *G06F 1/16* | (2006.01) |
| *A47B 23/04* | (2006.01) |
| *F16M 11/24* | (2006.01) |

(52) U.S. Cl.
CPC .......... *H02J 7/0044* (2013.01); *A47B 23/043* (2013.01); *F16M 11/24* (2013.01); *G06F 1/1607* (2013.01); *G06F 1/1626* (2013.01); *G06F 1/1632* (2013.01); *G06F 1/1637* (2013.01); *G06F 1/181* (2013.01); *G06F 1/189* (2013.01); *H02J 7/0027* (2013.01)

(58) Field of Classification Search
CPC ...... G06F 1/181; G06F 1/1607; G06F 1/1626; G06F 1/1632; G06F 1/1637; G06F 1/189
USPC .................................................... 361/679.01
See application file for complete search history.

(56) References Cited

U.S. PATENT DOCUMENTS

| | | |
|---|---|---|
| 4,683,424 A | 7/1987 | Cutright et al. |
| 4,720,048 A | 1/1988 | Maroney et al. |
| 4,922,721 A | 5/1990 | Robertson et al. |

(Continued)

FOREIGN PATENT DOCUMENTS

| | | |
|---|---|---|
| CN | 1957313 A | 5/2007 |
| CN | 101604186 A | 12/2009 |

(Continued)

OTHER PUBLICATIONS

"U.S. Appl. No. 13/650,702, PTO Response to Rule 312 Communication mailed Aug. 9, 2016", 2 pgs.

(Continued)

*Primary Examiner* — David Warren
(74) *Attorney, Agent, or Firm* — Schwegman Lundberg & Woessner, P.A.

(57) ABSTRACT

Support systems and related methods for supporting tablets and monitors. A stand that includes a monitor support portion configured to support a monitor and a tablet support portion configured to support a tablet.

20 Claims, 8 Drawing Sheets

(56) References Cited

U.S. PATENT DOCUMENTS

| | | |
|---|---|---|
| 5,301,346 A | 4/1994 | Notarianni et al. |
| 5,436,792 A | 7/1995 | Leman et al. |
| 5,457,745 A | 10/1995 | Wang |
| 5,513,066 A | 4/1996 | Berman |
| 5,528,453 A | 6/1996 | Berman et al. |
| 5,621,890 A | 4/1997 | Notarianni et al. |
| 5,687,717 A | 11/1997 | Halpern et al. |
| 5,899,421 A | 5/1999 | Silverman |
| 6,008,621 A | 12/1999 | Madison et al. |
| 6,189,849 B1 | 2/2001 | Sweere et al. |
| 6,218,796 B1 | 4/2001 | Kozlowski |
| D450,903 S | 11/2001 | Wacker et al. |
| 6,336,691 B1 | 1/2002 | Maroney et al. |
| 6,434,512 B1 | 8/2002 | Discenzo |
| 6,480,391 B1 | 11/2002 | Monson et al. |
| 6,545,863 B2 | 4/2003 | Huggins |
| 6,667,877 B2 | 12/2003 | Duquette |
| 6,783,105 B2 | 8/2004 | Oddsen, Jr. |
| 6,796,844 B1 | 9/2004 | Edwards, III |
| 6,967,632 B1 | 11/2005 | Minami et al. |
| 7,028,966 B2 | 4/2006 | Bauman et al. |
| 7,055,833 B2 | 6/2006 | Wixted et al. |
| 7,130,190 B1 | 10/2006 | Baker |
| 7,160,113 B2 | 1/2007 | McConnell |
| 7,238,042 B2 | 7/2007 | Chen et al. |
| 7,252,277 B2 | 8/2007 | Sweere et al. |
| 7,274,564 B2 | 9/2007 | Rossini |
| 7,325,891 B1 | 2/2008 | Kinsley et al. |
| 7,511,959 B2 | 3/2009 | Belady |
| 7,529,083 B2 | 5/2009 | Jeong |
| 7,537,190 B2 | 5/2009 | Fan |
| 7,551,458 B2 | 6/2009 | Carnevali |
| 7,595,995 B2 | 9/2009 | Hock |
| 7,643,291 B2 | 1/2010 | Mallia et al. |
| 7,679,902 B2 | 3/2010 | Thompson |
| 7,800,914 B2 | 9/2010 | Dully |
| 7,813,118 B2 | 10/2010 | Burge |
| 7,845,608 B1 | 12/2010 | Chen et al. |
| 7,887,014 B2 | 2/2011 | Lindblad et al. |
| 7,984,886 B2 | 7/2011 | Lin |
| 8,047,383 B2 | 11/2011 | Hendrix et al. |
| 8,066,242 B2 | 11/2011 | Potter et al. |
| 8,074,951 B2 | 12/2011 | Carnevali |
| 8,199,474 B2 | 6/2012 | Liu et al. |
| 8,240,628 B2 | 8/2012 | Huang |
| 8,243,428 B2 | 8/2012 | Fu |
| 8,243,455 B1 | 8/2012 | Raymond et al. |
| 8,320,110 B2 | 11/2012 | Chen |
| 8,422,206 B2 | 4/2013 | Fu et al. |
| 8,469,325 B2 | 6/2013 | Yu |
| 8,503,182 B2 | 8/2013 | Petrick |
| 8,752,848 B2 | 6/2014 | Petrick et al. |
| 8,811,007 B2 | 8/2014 | Zhou |
| 8,833,716 B2 | 9/2014 | Funk et al. |
| 9,030,828 B2 | 5/2015 | Lindblad et al. |
| 9,163,779 B2 | 10/2015 | Funk et al. |
| 9,182,793 B2 | 11/2015 | Ergun et al. |
| 9,207,722 B2 * | 12/2015 | Ergun .................. G06F 1/1607 |
| 9,298,225 B2 | 3/2016 | Lindblad |
| 9,441,782 B2 | 9/2016 | Funk et al. |
| 2003/0001055 A1 | 1/2003 | Harary et al. |
| 2003/0021091 A1 | 1/2003 | Robbins et al. |
| 2003/0028588 A1 | 2/2003 | Mcconnell et al. |
| 2003/0111245 A1 | 6/2003 | Haggerty |
| 2003/0141687 A1 | 7/2003 | Wixted et al. |
| 2003/0184035 A1 | 10/2003 | Yu |
| 2003/0222848 A1 | 12/2003 | Solomon et al. |
| 2003/0227753 A1 | 12/2003 | Wrycraft |
| 2003/0235029 A1 | 12/2003 | Doherty et al. |
| 2004/0058704 A1 | 3/2004 | Peiker |
| 2004/0139571 A1 | 7/2004 | Chang et al. |
| 2004/0240167 A1 | 12/2004 | Ledbetter et al. |
| 2004/0257753 A1 | 12/2004 | Rossini |
| 2005/0030706 A1 | 2/2005 | Kim |
| 2005/0110461 A1 | 5/2005 | Mcconnell et al. |
| 2006/0027718 A1 | 2/2006 | Quijano et al. |
| 2006/0274495 A1 | 12/2006 | Nakamura et al. |
| 2007/0002533 A1 | 1/2007 | Kogan et al. |
| 2007/0049071 A1 * | 3/2007 | Jackson ................ G06F 1/189 439/79 |
| 2007/0058344 A1 | 3/2007 | Baker |
| 2007/0084978 A1 | 4/2007 | Martin et al. |
| 2007/0168593 A1 * | 7/2007 | Montag ................ G06F 1/1632 710/303 |
| 2007/0259554 A1 | 11/2007 | Lindblad |
| 2008/0106870 A1 | 5/2008 | Dully |
| 2008/0117578 A1 * | 5/2008 | Moscovitch ........... F16M 11/10 361/679.04 |
| 2008/0225472 A1 * | 9/2008 | Chih .................... F16M 11/10 361/679.04 |
| 2009/0016008 A1 | 1/2009 | Hock |
| 2009/0090825 A1 * | 4/2009 | Jung .................... G06F 1/1601 248/205.1 |
| 2009/0096336 A1 | 4/2009 | Petrick et al. |
| 2009/0122474 A1 * | 5/2009 | Mickey ................ F16M 11/126 361/679.04 |
| 2009/0134285 A1 | 5/2009 | Huang |
| 2009/0146911 A1 * | 6/2009 | Kang .................... G06F 1/1601 345/1.3 |
| 2009/0240370 A1 | 9/2009 | Nichols et al. |
| 2009/0267772 A1 | 10/2009 | Dehnadi |
| 2009/0270727 A1 * | 10/2009 | Zhao ...................... A61B 8/00 600/437 |
| 2010/0176254 A1 | 7/2010 | Sweere et al. |
| 2011/0193524 A1 | 8/2011 | Hazzard et al. |
| 2011/0240830 A1 | 10/2011 | Alemozafar et al. |
| 2011/0264927 A1 | 10/2011 | Dearborn et al. |
| 2011/0266930 A1 | 11/2011 | Petrick et al. |
| 2011/0267782 A1 | 11/2011 | Petrick et al. |
| 2011/0309591 A1 | 12/2011 | Petrick et al. |
| 2012/0087074 A1 | 4/2012 | Chen |
| 2012/0119040 A1 * | 5/2012 | Ergun .................... A47B 21/02 248/126 |
| 2012/0173033 A1 | 7/2012 | Tischer |
| 2012/0187056 A1 * | 7/2012 | Hazzard ................ A47B 21/02 211/26 |
| 2012/0206867 A1 * | 8/2012 | Pence ................ F16M 11/041 361/679.01 |
| 2012/0223676 A1 | 9/2012 | Petrick et al. |
| 2013/0050932 A1 * | 2/2013 | Williams ............. G06F 1/1632 361/679.41 |
| 2013/0092805 A1 | 4/2013 | Funk et al. |
| 2013/0092811 A1 | 4/2013 | Funk et al. |
| 2013/0200584 A1 | 8/2013 | Guasta |
| 2013/0262248 A1 | 10/2013 | Kim et al. |
| 2013/0277520 A1 | 10/2013 | Funk et al. |
| 2013/0277930 A1 | 10/2013 | Ergun et al. |
| 2013/0279106 A1 | 10/2013 | Ergun et al. |
| 2013/0279109 A1 | 10/2013 | Lindblad et al. |
| 2014/0160642 A1 * | 6/2014 | Wu ...................... G06F 1/1613 361/679.01 |
| 2014/0268510 A1 * | 9/2014 | Su ........................ H05K 7/16 361/679.01 |
| 2015/0192968 A1 | 7/2015 | Lindblad et al. |
| 2015/0212546 A1 * | 7/2015 | Ram .................... G06F 1/1601 361/679.01 |
| 2015/0245708 A1 * | 9/2015 | Abernethy ............. B62B 3/02 361/679.4 |
| 2015/0250315 A1 * | 9/2015 | Gross .................... F16M 11/10 361/679.01 |
| 2016/0033329 A1 * | 2/2016 | Zdinak ................. G01J 3/0291 361/679.01 |
| 2016/0037910 A1 * | 2/2016 | Ergun .................. G06F 1/1607 361/679.26 |
| 2016/0111902 A1 * | 4/2016 | Ergun .................. G06F 1/1607 320/114 |

FOREIGN PATENT DOCUMENTS

| | | |
|---|---|---|
| CN | 101887658 A | 11/2010 |
| CN | 102076198 A | 5/2011 |
| EP | 0997399 A2 | 5/2000 |

(56) References Cited

FOREIGN PATENT DOCUMENTS

| EP | 2045689 A2 | 4/2009 |
|---|---|---|
| EP | 2766784 A1 | 8/2014 |
| WO | WO-01/77799 A1 | 10/2001 |
| WO | WO-03/107157 A2 | 12/2003 |
| WO | WO-2011/017757 A1 | 2/2011 |
| WO | WO 2013/056025 A1 | 4/2013 |
| WO | WO-2013/056029 A1 | 4/2013 |
| WO | WO-2013/056115 A1 | 4/2013 |

OTHER PUBLICATIONS

"U.S. Appl. No. 14/639,702, Preliminary Amendment filed Mar. 5, 2015", 3 pgs.
"U.S. Appl. No. 14/919,520, Non Final Office Action mailed Oct. 11, 2016", 14 pgs.
"U.S. Appl. No. 15/240,868, Preliminary Amendment filed Sep. 23, 2016", 8 pgs.
"Chinese Application Serial No. 201280061710.4, Office Action mailed Aug. 5, 2016", (w/English Translation), 26 pgs.
"Chinese Application Serial No. 201280061863.9, Office Action mailed Aug. 22, 2016", (w/English Translation), 28 pgs.
"European Application Serial No. 12780976.2, Office Action mailed Jul. 23, 2014", 2 pgs.
"European Application Serial No. 12780976.2, Response filed Jan. 22, 2015 to Office Action mailed Jul. 23, 2014", 12 pgs.
"International Application Serial No. PCT/US2012/059922, Written Opinion mailed Feb. 4, 2013", 4 pgs.
"International Application Serial No. PCT/US2012/059926, Written Opinion mailed Feb. 8, 2013", 5 pgs.
"U.S. Appl. No. 14/639,702, Notice of Allowance mailed Nov. 24, 2015", 8 pgs.
"U.S. Appl. No. 13/650,702, Final Office Action mailed Jan. 6, 2016", 14 pgs.
"U.S. Appl. No. 13/025,782, Non Final Office Action mailed Oct. 9, 2012", 11 pgs.
"U.S. Appl. No. 13/650,572, Non Final Office Action mailed May 12, 2014", 9 pgs.
"U.S. Appl. No. 13/650,572, Notice of Allowance mailed Jan. 16, 2015", 8 pgs.
"U.S. Appl. No. 13/650,572, Notice of Allowance mailed Sep. 16, 2014", 8 pgs.
"U.S. Appl. No. 13/650,572, Response filed Aug. 12, 2014 to Non Final Office Action mailed May 12, 2014", 10 pgs.
"U.S. Appl. No. 13/650,616, Advisory Action mailed May 27, 2015", 3 pgs.
"U.S. Appl. No. 13/650,616, Final Office Action mailed Feb. 20, 2015", 8 pgs.
"U.S. Appl. No. 13/650,616, Non Final Office Action mailed Oct. 1, 2014", 7 pgs.
"U.S. Appl. No. 13/650,616, Notice of Allowance mailed Jul. 14, 2015", 9 pgs.
"U.S. Appl. No. 13/650,616, Notice of Allowance mailed Aug. 21, 2015", 8 pgs.
"U.S. Appl. No. 13/650,616, Response filed Apr. 20, 2015 to Final Office Action mailed Feb. 20, 2015", 8 pgs.
"U.S. Appl. No. 13/650,616, Response filed Jun. 9, 2015 to Advisory Action mailed May 27, 2015", 7 pgs.
"U.S. Appl. No. 13/650,616, Response filed Jun. 24, 2014 to Restriction Requirement mailed Apr. 29, 2014", 5 pgs.
"U.S. Appl. No. 13/650,616, Response filed Dec. 19, 2014 to Non Final Office Action mailed Oct. 1, 2014", 9 pgs.
"U.S. Appl. No. 13/650,616, Restriction Requirement mailed Apr. 29, 2014", 6 pgs.
"U.S. Appl. No. 13/650,631, Non Final Office Action mailed Oct. 9, 2013", 10 pgs.
"U.S. Appl. No. 13/650,631, Notice of Allowance mailed May 21, 2014", 8 pgs.
"U.S. Appl. No. 13/650,631, Response filed Feb. 7, 2014 to Non Final Office Action mailed Oct. 9, 2013", 11 pgs.
"U.S. Appl. No. 13/650,631, Response filed Sep. 26, 2013 to Restriction Requirement mailed Aug. 29, 2013", 2 pgs.
"U.S. Appl. No. 13/650,631, Restriction Requirement mailed Aug. 29, 2013", 6 pgs.
"U.S. Appl. No. 13/650,702, Advisory Action mailed Jun. 22, 2015", 3 pgs.
"U.S. Appl. No. 13/650,702, Final Office Action mailed Mar. 26, 2015", 16 pgs.
"U.S. Appl. No. 13/650,702, Non Final Office Action mailed Jul. 20, 2015", 15 pgs.
"U.S. Appl. No. 13/650,702, Non Final Office Action mailed Sep. 29, 2014", 14 pgs.
"U.S. Appl. No. 13/650,702, Response filed Apr. 10, 2014 to Restriction Requirement mailed Feb. 12, 2014", 12 pgs.
"U.S. Appl. No. 13/650,702, Response filed May 15, 2015 to Final Office Action mailed Mar. 26, 2015", 15 pgs.
"U.S. Appl. No. 13/650,702, Response filed Jul. 28, 2015 to Restriction Requirement mailed Jun. 26, 2015", 12 pgs.
"U.S. Appl. No. 13/650,702, Response filed Oct. 20, 2015 to Non Final Office Action mailed Jul. 20, 2015", 13 pgs.
"U.S. Appl. No. 13/650,702, Response filed Dec. 17, 2014 Non Final Office Action mailed Sep. 29, 2014", 12 pgs.
"U.S. Appl. No. 13/650,702, Restriction Requirement mailed Feb. 12, 2014", 10 pgs.
"U.S. Appl. No. 13/650,702, Restriction Requirement mailed Jun. 26, 2014", 10 pgs.
"U.S. Appl. No. 13/650,736, Advisory Action mailed Jun. 2, 2015", 3 pgs.
"U.S. Appl. No. 13/650,736, Corrected Notice of Allowance mailed Aug. 12, 2015", 4 pgs.
"U.S. Appl. No. 13/650,736, Examiner Interview Summary mailed May 26, 2015", 3 pgs.
"U.S. Appl. No. 13/650,736, Final Office Action mailed Apr. 9, 2015", 13 pgs.
"U.S. Appl. No. 13/650,736, Non Final Office Action mailed Nov. 28, 2014", 20 pgs.
"U.S. Appl. No. 13/650,736, Notice of Allowance mailed Jul. 27, 2015", 8 pgs.
"U.S. Appl. No. 13/650,736, Response filed Feb. 26, 2015 to Non Final Office Action mailed Nov. 28, 2014", 13 pgs.
"U.S. Appl. No. 13/650,736, Response filed May 22, 2015 to Final Office Action mailed Apr. 9, 2015", 13 pgs.
"U.S. Appl. No. 13/651,066, Examiner Interview Summary mailed Jun. 10, 2015", 3 pgs.
"U.S. Appl. No. 13/651,066, Final Office Action mailed Oct. 28, 2014", 9 pgs.
"U.S. Appl. No. 13/651,066, Non Final Office Action mailed Feb. 5, 2015", 7 pgs.
"U.S. Appl. No. 13/651,066, Non Final Office Action mailed May 13, 2015", 8 pgs.
"U.S. Appl. No. 13/651,066, Non Final Office Action mailed Jul. 15, 2014", 10 pgs.
"U.S. Appl. No. 13/651,066, Notice of Allowance mailed Jun. 24, 2015", 8 pgs.
"U.S. Appl. No. 13/651,066, Response filed Jan. 19, 2015 to Final Office Action mailed Oct. 28, 2014", 10 pgs.
"U.S. Appl. No. 13/651,066, Response filed Apr. 27, 2015 to Non Final Office Action mailed Feb. 5, 2015", 7 pgs.
"U.S. Appl. No. 13/651,066, Response filed Jun. 4, 2015 to Non Final Office Action mailed May 13, 2015", 10 pgs.
"U.S. Appl. No. 13/651,066, Response filed Jun. 24, 2014 to Restriction Requirement mailed May 27, 2014", 7 pgs.
"U.S. Appl. No. 13/651,066, Response filed Oct. 9, 2014 to Non Final Office Action mailed Jul. 15, 2014", 10 pgs.
"U.S. Appl. No. 13/651,066, Restriction Requirement mailed May 27, 2014", 6 pgs.
"Ergotron® WorkFit C-Mod", Product Sheet © 2009 Ergotron, Inc., (Aug. 10, 2009), 2 pgs.
"International Application Serial No. PCT/US2011/024534, International Search Report mailed Apr. 15, 2011", 2 pgs.
"International Application Serial No. PCT/US2011/024534, Written Opinion mailed Apr. 15, 2011", 8 pgs.

(56) References Cited

OTHER PUBLICATIONS

"International Application Serial No. PCT/US2012/059922, International Preliminary Report on Patentability mailed Apr. 24, 2014", 6 pgs.
"International Application Serial No. PCT/US2012/059922, International Search Report mailed Feb. 4, 2013", 3 pgs.
"International Application Serial No. PCT/US2012/059922, Written Opinion mailed Feb. 4, 2013", 5 pgs.
"International Application Serial No. PCT/US2012/059926, International Preliminary Report on Patentability mailed Apr. 24, 2014", 7 pgs.
"International Application Serial No. PCT/US2012/059926, International Search Report mailed Feb. 8, 2013", 3 pgs.
"International Application Serial No. PCT/US2012/059926, Written Opinion mailed Feb. 8, 2013", 3 pgs.
"International Application Serial No. PCT/US2012/060042, International Search Report mailed Jan. 30, 2013", 4 pgs.
"International Application Serial No. PCT/US2012/060042, Written Opinion mailed Jan. 30, 2013", 6 pgs.
"International Application Serial No. PCT/US2012/060049, International Search Report mailed Feb. 19, 2013", 4 pgs.
"International Application Serial No. PCT/US2012/060049, Written Opinion mailed Feb. 19, 2013", 7 pgs.
"International Application Serial No. PCT/US2012/060053, International Preliminary Report on Patentability mailed Apr. 24, 2014", 7 pgs.
"International Application Serial No. PCT/US2012/060053, International Search Report mailed Feb. 25, 2013", 4 pgs.
"International Application Serial No. PCT/US2012/060053, Written Opinion mailed Feb. 25, 2013", 5 pgs.
"International Application Serial No. PCT/US2012/060056, International Preliminary Report on Patentability mailed Apr. 24, 2014", 7 pgs.
"International Application Serial No. PCT/US2012/060056, International Search Report mailed Feb. 22, 2013", 3 pgs.
"International Application Serial No. PCT/US2012/060056, Written Opinion mailed Feb. 22, 2013", 5 pgs.
"U.S. Appl. No. 13/650,702, Corrected Notice of Allowance mailed May 24, 2016", 6 pgs.
"U.S. Appl. No. 13/650,702, Notice of Allowance mailed May 5, 2016", 9 pgs.
"U.S. Appl. No. 13/650,702, Response filed Mar. 7, 2016 to Final Office Action mailed Jan. 6, 2016", 15 pgs.

* cited by examiner

TABLET AND MONITOR SUPPORT SYSTEMS

RELATED APPLICATIONS

This application is a continuation of U.S. application Ser. No. 13/650,616, filed Oct. 12, 2012, which claims the benefit of U.S. Provisional Application Ser. Nos. 61/547,257, 61/553,620, and 61/590,032, all three of which are entitled Tablet Mounting Systems and Methods, filed Oct. 14, 2011, Oct. 31, 2011, and Jan. 24, 2012, respectively, the contents of each of which are hereby incorporated by reference.

FIELD

This disclosure generally relates to systems, devices and methods for supporting a mobile computing device, such as a tablet computing device.

BACKGROUND

Tablets, sometimes referred to as tablet computers, are generally planar, lightweight devices that include a touch-screen display. Examples include the Apple iPad, Kindle Fire, Motorola Xoom, Samsung Galaxy, Blackberry Playbook, LG Optimus Pad, Dell Streak, HP TouchPad, HTC Flyer, and Viewsonic Viewpad. Generally, tablets have a rectangular form factor about 20 CM to about 30 CM in length, about 10 CM to about 20 CM in height, and about 1 CM in thickness, with a weight of between about 400 grams to about 1 KG. Tablets also generally have a LCD or TFT display panel with a screen size of between about 15 CM and about 25 CM, between 500 MB and 1 GB of RAM, front and/or rear camera(s), about 16 GB to about 64 GB of storage, at least one HDMI and/or USB input/output, audio and charging inputs/outputs, and 3G/4G and WiFi network connections.

Tablets have many features that make them portable by nature. For example, tablets are battery powered and need only to be plugged in periodically to recharge the battery; the touch-screen display of tablets allows tablets to be operated without the use of a computer peripheral device like a mouse or keyboard; and, as noted above, the 3G/4G and WiFi network connections provide the tablet mobile internet connectivity. These features of tablets, in addition to their small form factor, allow for a high degree of portability. Consequently, a single tablet is often used in many different environments.

In most environments a user will operate a tablet while simply holding it in her hands. Some environments, however, may provide other opportunities to position a tablet. For example, a person using a tablet at a desk may place the tablet flat on the desk, prop the tablet up with books, or lean the tablet up against a wall. In addition, some tablet cases or covers are able to fold into a configuration that supports the tablet in a free-standing position.

SUMMARY

Embodiments of the invention include support systems and related methods for tablets and monitors. In some embodiments, the system includes a stand with a monitor support portion configured to support a monitor and a tablet support portion configured to support a tablet. As described herein, the stand can be configured to position a supported monitor and tablet such that separate users can see either the monitor or the tablet but not the other of the monitor and tablet. Other configurations can be configured to position the supported monitor and tablet such that a single user can simultaneously view the monitor and the tablet.

BRIEF DESCRIPTION OF THE DRAWINGS

The following drawings are illustrative of particular embodiments of the invention and therefore do not limit the scope of the invention. The drawings are not necessarily to scale (unless so stated) and are intended for use in conjunction with the explanations in the following detailed description. Embodiments of the invention will hereinafter be described in conjunction with the appended drawings, wherein like numerals denote like elements.

DETAILED DESCRIPTION

The following detailed description is exemplary in nature and is not intended to limit the scope, applicability, or configuration of the invention in any way. Rather, the following description provides some practical illustrations for implementing exemplary embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

Embodiments described herein provide systems and devices for mounting and supporting tablet computing devices. As discussed above, tablet computing devices are well known and are also referred to herein as tablets. In general, a tablet is a mobile computer, typically integrated into a flat touch screen and primarily operated by touching the screen. This can often include the use of an onscreen virtual keyboard, rather than a physical keyboard. The form factor of a tablet offers a more mobile way to interact with a computer.

In some embodiments a supported tablet can be used in conjunction with an auxiliary monitor (sometimes referred to herein as a display) located below, above, or to either side of the tablet to create a multiple display system. In certain embodiments a tablet can be electrically connected to and control the auxiliary monitor. In such multiple display systems, the tablet can act as the driver for images displayed on the tablet's screen and on one or more other display device(s).

Figure 1:
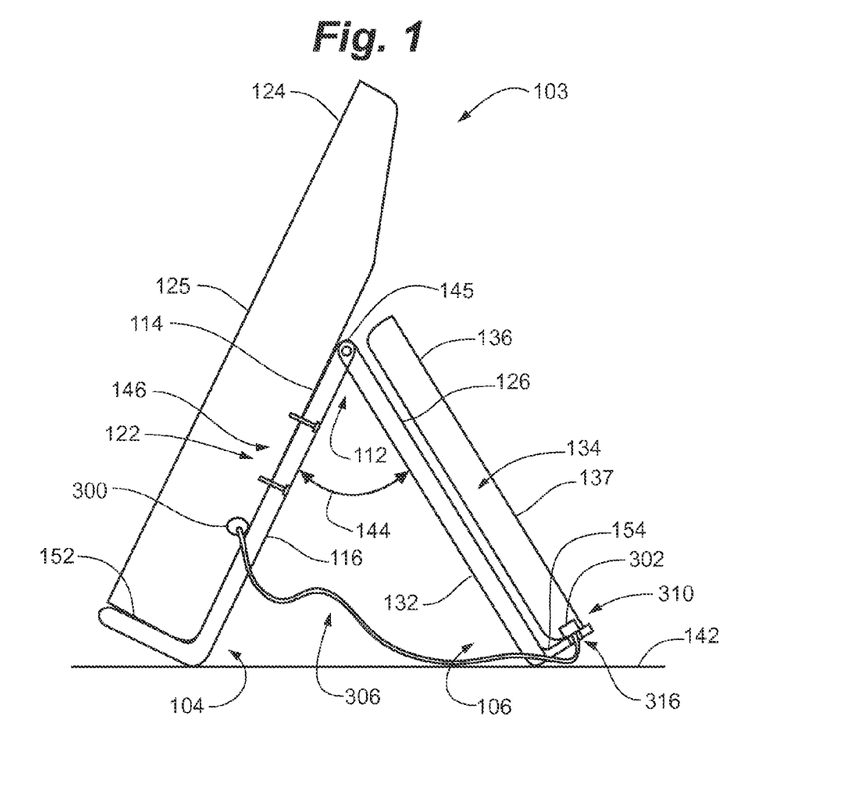
FIG. 1 is a side elevation view of a tablet and monitor stand with a supported tablet and a supported monitor in accordance with an embodiment.

As depicted in FIG. 1, a single stand can be used to support both a monitor and a tablet, according to some embodiments. A tablet and monitor stand 103 can include a monitor component 104, a tablet component 106 and a juncture portion 112. The monitor component 104 can have a front side 114 and a rear side 116. The front side 114 can have a monitor support portion 122 that is configured to support (e.g., retain and/or be connected to) an external monitor 124 having a screen 125 generally parallel to the front side and facing the same direction as the front side. The tablet component 106 can also have a front side 126 and a rear side 132. The front side 126 of the tablet component 106 can have a tablet support portion 134 that is configured to support a tablet 136 having a screen 137 generally parallel to the front side and facing the same direction as the front side. The tablet component 106 and the monitor component 104 can connect at the juncture portion 112. As shown in FIG. 1, the front side 114 of the monitor component 104 and the front side 126 of the tablet component 106 are facing in substantially opposite directions, in this case the front side 114 of the monitor component 104 is generally facing the left hand side of the drawing, while the front side 126 of the tablet component 106 is generally facing the right hand side of the drawing. Also, as illustrated in FIG. 1, the rear side 116 of the monitor component 104 and the rear side 132 of the tablet component 106 are substantially facing each other.

A tablet and monitor stand can be formed from multiple parts which can then be joined together by, for example, adhesives, rivets or screws. Alternatively, a tablet and monitor stand can be formed as a single unibody part. For example, the juncture portion 112, as depicted in FIG. 1, can be any structure useful for connecting the monitor component 104 to the tablet component 106. Thus, juncture portion 112 can include a flexible component with high ductility properties that can easily bend while at the same time retaining the newly bent shape, or the juncture portion 112 can be a hinge that is movable, or it can have a fixed angle. In addition, the juncture portion can also be a bend, or a formed angle of inflection in a unibody tablet and monitor stand, for example.

In some embodiments, a supported monitor 124 with a screen 125 can face in the opposite direction of a supported tablet 136 with a screen 137. As depicted in FIG. 1, the monitor 124 is viewable from the left hand side of the drawing, while the tablet is viewable from the right hand side of the drawing. Such an embodiment can permit two users who are facing each other to view images displayed on the monitor 124 and on the tablet 136, respectively. As will be discussed in greater detail below, in some embodiments a supported tablet can act as a driver for images displayed on both the tablet's screen and on a supported monitor. In some embodiments, no other processor is in electrical communication with the monitor. In certain embodiments, images that are displayed on the tablet's screen can be identical (although potentially smaller) to images that are displayed on the monitor. According to other embodiments, images that are displayed on the tablet's screen can be different from the images that are displayed on the monitor. Thus in corresponding embodiments, users who are facing each other can view the same images, one user viewing the images displayed on the tablet's screen, while the other user viewing images that are displayed on the monitor. And in some embodiments, users who are facing each other can view different images, one arrangement of images displayed on the tablet's screen, another displayed on the monitor. In some configurations, a tablet may be capable of switching from displaying the same images on the tablet's screen and on a monitor, to displaying different images on the tablet's screen and on a monitor, and back again.

Tablet and monitor stand 103 can rest on any horizontal surface 142, such as a desk, a mobile cart, a counter, or on any other work surface. In some embodiments, the bottom edge of each monitor and tablet component or portion can rest on the surface. Such embodiments may be generally shaped as an inverted V, with the legs of the V resting on the surface. Other embodiments include a base with a horizontal surface to rest on the surface.

The juncture portion 112 can be adjustable, such that the respective screens of supported monitors and tablets can be positioned more or less parallel with respect to each other, as desired. Movement of the juncture portion can include permitting adjustment of the angle 144 that the rear side of the monitor component 104 makes with the rear side 132 of the tablet component 106. Angle 144 can range in magnitude from about five degrees to about 175 degrees. Adjustment of angle 144 can permit users to adjust the tablet and monitor stand 103 to a desired angle for viewing the monitor and for viewing and/or for interacting with the tablet. In some embodiments, angle 144 can be adjusted using a hinge 145 or a material with high ductility properties as the juncture portion 112. In configurations assuming an inverted V shape, the hinge can be positioned at the apex of the inverted V such that it is the highest portion of the stand. In some embodiments, the hinge includes sufficient friction to maintain a selected angle between the monitor and tablet support portions.

According to some embodiments, the monitor support portion 122 of the tablet and monitor stand 103 can also include a support arrangement 146, such as a VESA (Video Electronics Standards Association) compliant support arrangement, which includes a planar bracket portion with a hole pattern, to support the monitor 124. Also, as shown in FIG. 1, the monitor support portion 122 can include a sill portion 152, which can be configured to retain the monitor 124 by virtue of the sill's geometry relative to the bottom of the monitor. For example, the sill can be generally perpendicular to the screen and support arrangement 146. In certain embodiments, the monitor 124 can be supported by the sill portion 152 alone. In other embodiments the monitor support portion 122 supports the monitor 124 by interacting with the monitor's native support interface. In some embodiments, the monitor support portion 122 can use other methods of supporting a monitor, such as hook and loop fasteners which can be adhered to the back of a monitor 124 and to the front side 114 of the monitor component 104, for example.

In certain embodiments, the monitor 124 can be supported by the sill portion 152 acting cooperatively with support arrangement 146.

In some embodiments, the monitor and/or the monitor support portion can include captive screws, captive screw assemblies, quarter-turn or half-turn fasteners, quick release mechanisms and/or any other fastening device operable though the support arrangement. In some embodiments, the shape and/or hole pattern provided by the support arrangement may not be compatible with a particular monitor. In such situations, attachments may be accomplished through a mounting adaptor. Mounting adaptors can have two mounting patterns, such that otherwise incompatible mounting patterns can nevertheless be used for attachment.

The tablet support portion 134 depicted in FIG. 1 can include a sill portion 154. According to some embodiments, sill portion 154 can be configured to support the tablet 136 by virtue of the sill's geometry relative to the bottom of the tablet 136, for example, perpendicular. In some embodiments, the tablet 136 can be supported by the sill portion 154 alone. In other embodiments, the tablet support portion 134 can use other methods of supporting a tablet, such as hook and loop fasteners which can be adhered to the back of a tablet 136 and to the front side 126 of the tablet component 106, for example. In certain embodiments, the tablet 136 can be supported by the sill portion 154 acting cooperatively with a docking station as described herein.

In some embodiments, the tablet support portion 134 can be configured to releasably support a tablet 136. The tablet support portion 134 can include a sill portion 154 which can have a lip that can extend upwards perpendicularly from the sill such that it forms a C-shaped receptacle. The tablet support portion 134, the sill portion 154 and the lip can work cooperatively to releasably support a tablet 136 by deflecting to receive a tablet 136, and then springing back to support the tablet 136. In certain embodiments, the tablet support portion 134, the sill portion 154 and/or the lip can be made from an elastically deflectable material, which can include various plastics, metals or composite materials, which can include, for example, fiberglass or carbon fiber composites. In addition, silicone, rubber or any other elastomer can be inserted as a lining in order to enhance tablet retention.

Figure 2:
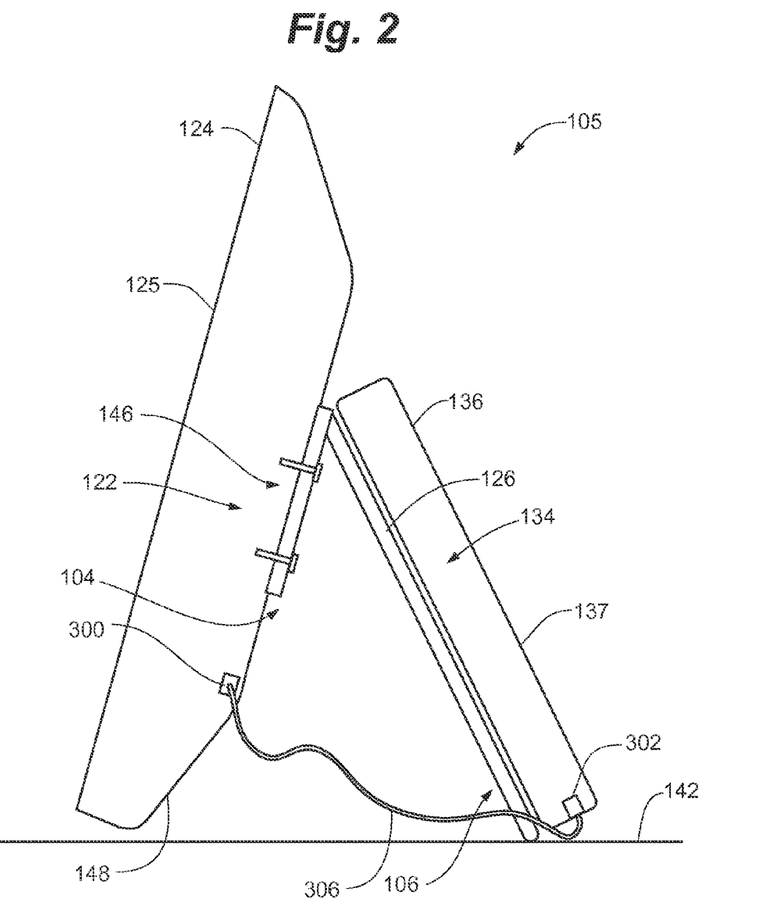
FIG. 2 is a side elevation view of a tablet and monitor stand with a supported tablet and a supported monitor in accordance with an embodiment.

In some embodiments, as depicted in stand 105 in FIG. 2, a frame 148 of a monitor can be used to rest directly on a horizontal surface 142 instead of a portion of the monitor support portion as described with respect to FIG. 1. As can be seen in the embodiment shown in FIG. 2, the monitor component 104 does not contact the horizontal surface 142. Monitor support component 104 or portion 122 supports the monitor 124 by interacting with the monitor's native support interface or other mounting provisions that can typically be found on the frame of display monitors. This can be, for example, a support arrangement 146. Similarly, although not shown in FIG. 2, a frame of the tablet can rest directly on the horizontal surface instead of a portion of the tablet support portion as shown in FIG. 1.

Figure 3A:
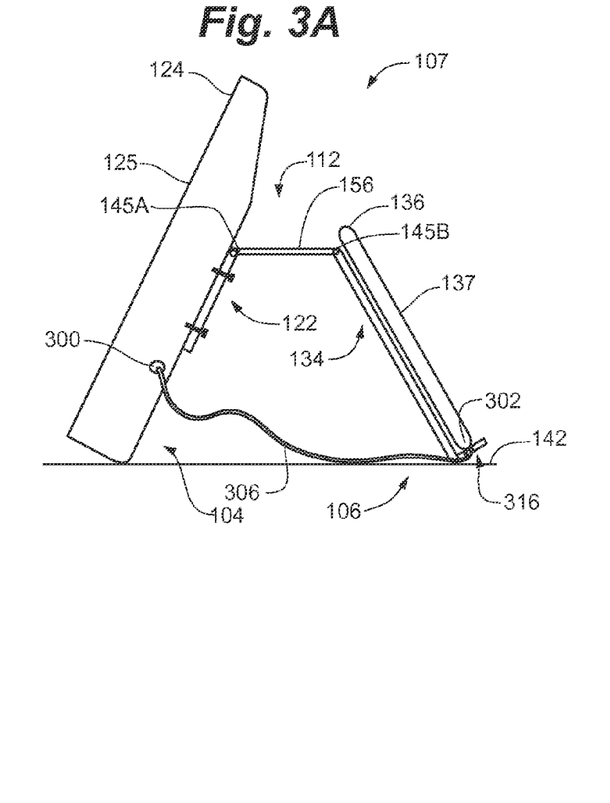
FIG. 3A is a side elevation view of a tablet and monitor stand with a supported tablet and a supported monitor in accordance with an embodiment.
Figure 3B:
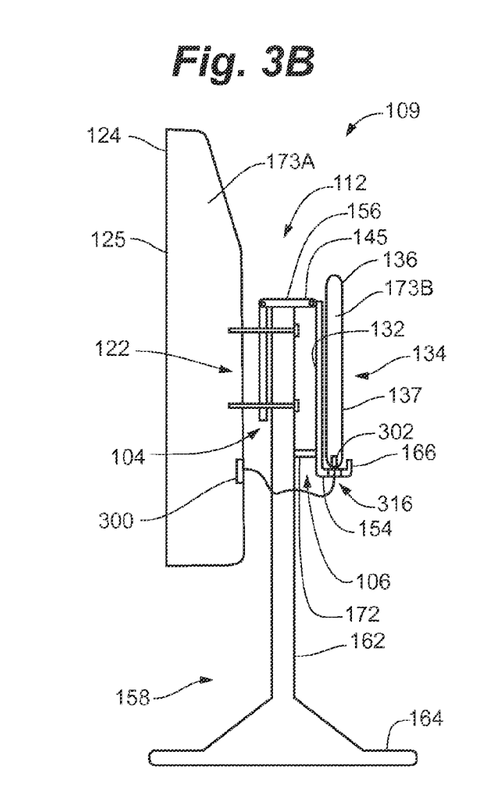
FIG. 3B is a side elevation view of a tablet and monitor stand, supported by a support object, with a supported tablet and a supported monitor in accordance with an embodiment.

In some embodiments, as depicted in FIGS. 3A and 3B, the juncture portion 112 can include a linking member 156. As shown in FIG. 3A, linking member 156 permits both the monitor component 104 and the tablet component 106 to be adjusted independently, one from the other via a first hinge 145A and a second hinge 145B. In some embodiments, as shown in FIG. 3A, linking member 156 permits the angle of the monitor component 104 and the tablet component 106 of the tablet and monitor stand 107 to be adjusted independently with respect to the linking member.

As shown in FIG. 3B, some embodiments of linking member 156 permit the tablet and monitor stand 109 to be conveniently supported by a support object 158, such as a desk stand. As shown, the stand 109 is in apposition and optionally attached to a vertical riser 162 of a desk stand. As shown, linking member 156 can include a substantially horizontal portion adapted to be in apposition with the support object. In some embodiments, the monitor support portion 122 can support the monitor 124 by interacting with the monitor's native support interface or other mounting provisions typically found on display monitors. This can be, for example, a support arrangement 146. In some embodiments, as depicted in FIG. 3B, a through bolt, or other fastener, can be used that engages with (i) the monitor's native support interface, (ii) the monitor support portion, and (iii) the support object's native support interface. In some embodiments, all three can be VESA compliant arrangements. In some embodiments, separate fasteners can be used to (i) fasten the monitor 124 to the front side 114 of the monitor support portion 122 and (ii) fasten the rear side 116 of the monitor support portion 122 to the support object. In some embodiments, the shape and/or hole pattern provided by a monitor support portion may not be compatible with a particular monitor. In such situations, attachments may be accomplished through a mounting adaptor. In some embodiments, the monitor, the monitor support portion and/or the support object can include captive screws, captive screw assemblies, quarter-turn or half-turn fasteners, quick release mechanisms and/or any other fastening device that would simplify the attachment.

As depicted in FIG. 3B, the support object 158 can include a vertical riser 162 that is supported by a base 164 with a planar surface adapted to sit on a horizontal surface. In some embodiments, tablet and monitor stand 109 can also be supported by other types of support objects, for example, a laptop stand or to a sit-stand workstation. In turn, support objects can, for example, rest on a desk or other work surface, attach to a mobile cart or to a wall, or clamp to a desk or counter.

As can be seen from FIG. 3B, the screen 125 of the monitor 124 can be parallel to the screen 137 of the tablet 136. In some instances, this can be an acceptable viewing angle for users of both the tablet and the monitor. In other cases, users may desire additional options for viewing the tablet and the monitor at other angles. Such adaptability can be achieved through an adjustor 172 that can be provided on the rear side 132 of the tablet component 106 or on the riser. In some embodiments, hinge 145 can be provided with sufficient friction to maintain a desired angle. In order to adjust the tilt angle of the monitor, a tilt mechanism can be incorporated into the support object itself.

Figure 4A:
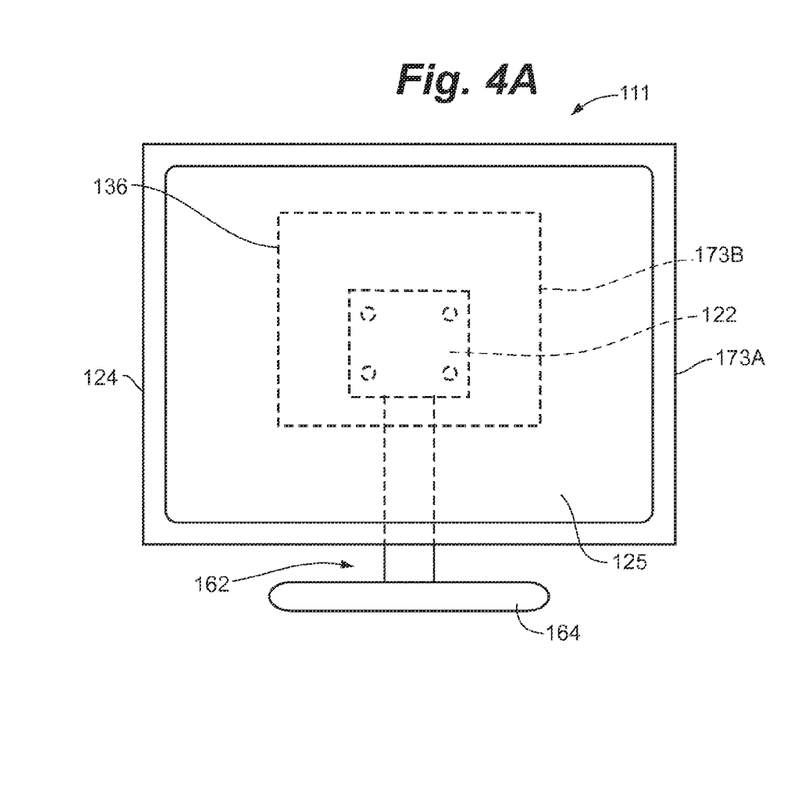
FIG. 4A is a front elevation view of a tablet and monitor stand with a supported tablet and a supported monitor in accordance with an embodiment.
Figure 4B:
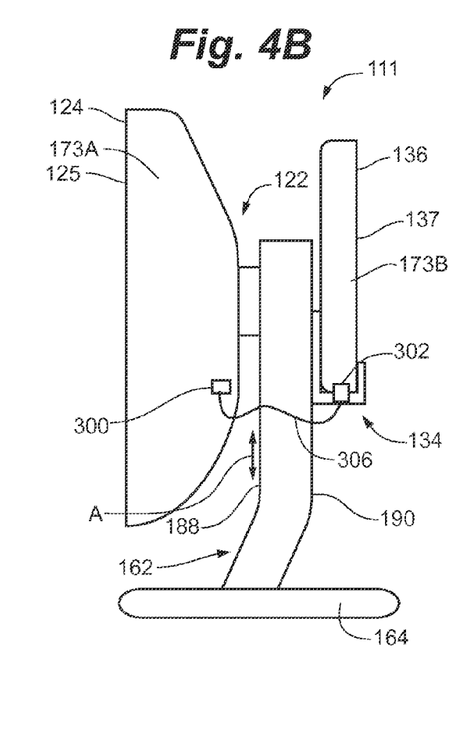
FIG. 4B is a side elevation view of a tablet and monitor stand with a supported tablet and a supported monitor with partially hidden views in accordance with an embodiment.

FIGS. 4A and 4B depict front and side elevation views of another tablet and monitor stand 111 in accordance with some embodiments. As shown, tablet and monitor stand 111 can include a vertical riser 162, a monitor support portion 122, and a tablet support portion 134. The vertical riser can have a front portion 188 and a rear portion 190. The monitor support portion 122 can be attached to the front portion 188 of the vertical riser 162, and the monitor support portion 122 can be configured to support a monitor 124 as described elsewhere herein. The tablet support portion 134 can be attached to the rear portion 190 of the vertical riser 162 and the tablet support portion 134 can be configured to support a tablet 136 such that a user viewing the supported monitor 124 cannot see the supported tablet 136. In some embodiments, the monitor support portion and tablet support portion positioned such that a perimeter 173A (e.g., the entire perimeter) of a supported monitor extends beyond a perimeter 173B (e.g., the entire perimeter) of a supported tablet in front plan view. As depicted in FIGS. 4A and 4B, a first user, who is positioned to face a second user, can view the screen 125 of supported monitor 124, at the same time, the second user who is positioned to face the first user, can view the screen 137 of supported tablet 136, and neither user can see the screen seen by the other user.

Figures 5A, 5B:
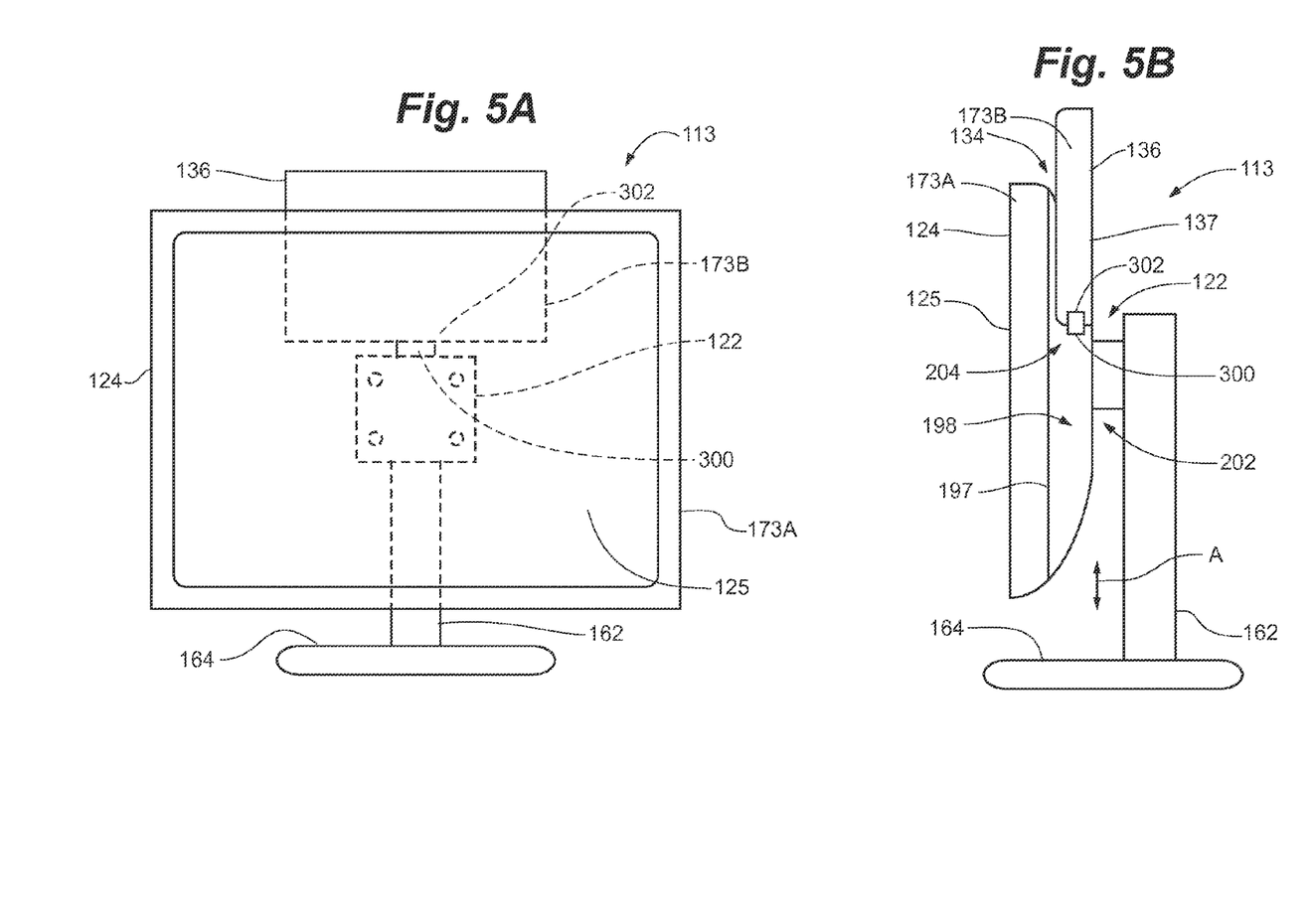
FIG. 5A is a front elevation view of a tablet and monitor stand with a supported tablet and a supported monitor with partially hidden views in accordance with an embodiment.
FIG. 5B is a side elevation view of a tablet and monitor stand with a supported tablet and a supported 122 monitor in accordance with an embodiment.

As shown in FIGS. 5A and 5B, an embodiment of a tablet and monitor stand 113 can include a vertical riser 162 and a monitor support portion 122. The monitor support portion 122 can have a front portion 198 and a rear portion 202. The monitor support portion 122 front portion 198 can be configured to support a monitor 124 and a tablet support portion 134 configured to releasably support a tablet 136. In some embodiments, the monitor 124 is integral with the front portion 198 of the monitor support portion. In other embodiments, the monitor can connect to the front portion along interface 197. In some embodiments, the tablet support portion is integral with the monitor (e.g., with its frame) or the monitor support portion, such that the tablet support portion includes surfaces located internally of the monitor or the monitor support portion. In certain embodiments, both the tablet support portion and at least the front portion of the monitor support portion are integral with the monitor. In some embodiments, the monitor support portion 122 rear portion 202 can be attached to the vertical riser 162. As depicted in FIGS. 5A and 5B, a user, who is positioned to face a supported monitor 124, cannot see the full viewing screen of a supported tablet 136. In some embodiments, a supported tablet is at least partially above a supported monitor, such that their perimeters 173 A/B overlap when viewed in front plan view. In the embodiment shown, the screen 125 of a supported monitor is parallel to and facing the opposite direction as the screen 137 of a supported tablet.

Figure 6A:
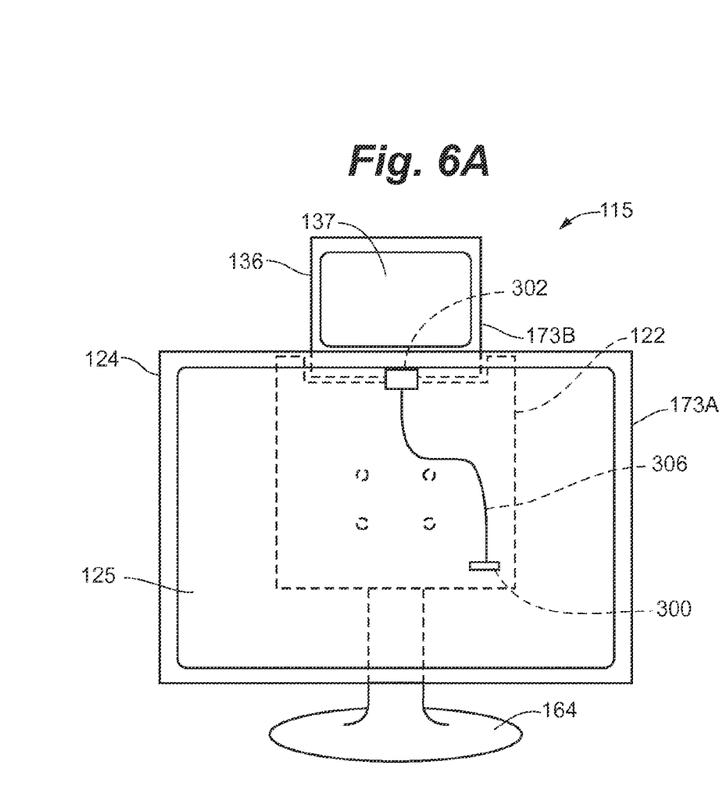
FIG. 6A is a front elevation view of a tablet and monitor stand with a supported tablet and a supported monitor with partially hidden views in accordance with an embodiment.
Figure 6B:
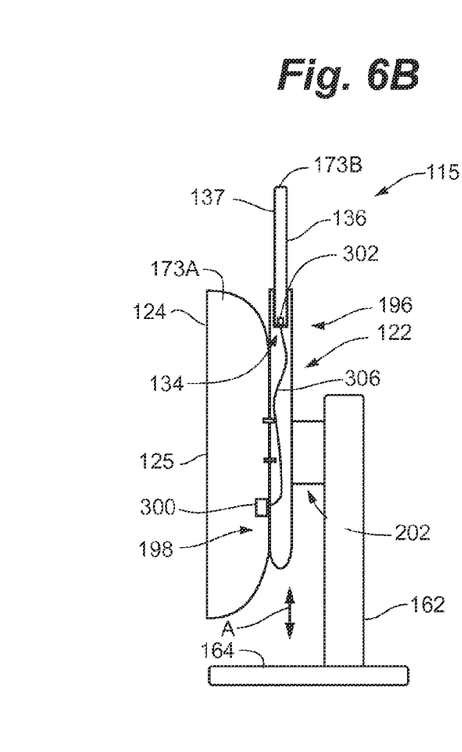
FIG. 6B is a side elevation view of a tablet and monitor stand with a supported tablet and a supported monitor in accordance with an embodiment.

In some embodiments, as shown in FIGS. 6A and 6B, tablet and monitor stand 115 can include a vertical riser 162 and a monitor support portion 122. The monitor support portion 122 can have a top portion 196, a front portion 198 and a rear portion 202. The front portion 198 can be configured to support a monitor 124, the rear portion 202 can be attached to the vertical riser 162, and a tablet support portion 134, which can be configured to releasably support a tablet 136, can be included in the top portion 196. As depicted in FIGS. 6A and 6B, a user, who is positioned to face a supported monitor 124, can see the full screen 137 of a supported tablet 136 (i.e., the perimeters of the monitor screen and tablet screen do not overlap in front plan view). As shown, the screen 125 of a supported monitor is parallel to and facing the same direction as the screen 137 of a supported tablet. In other embodiments, the screen 125 of a supported monitor is parallel to and facing the opposite direction as the screen 137 of a supported tablet.

Figure 7:
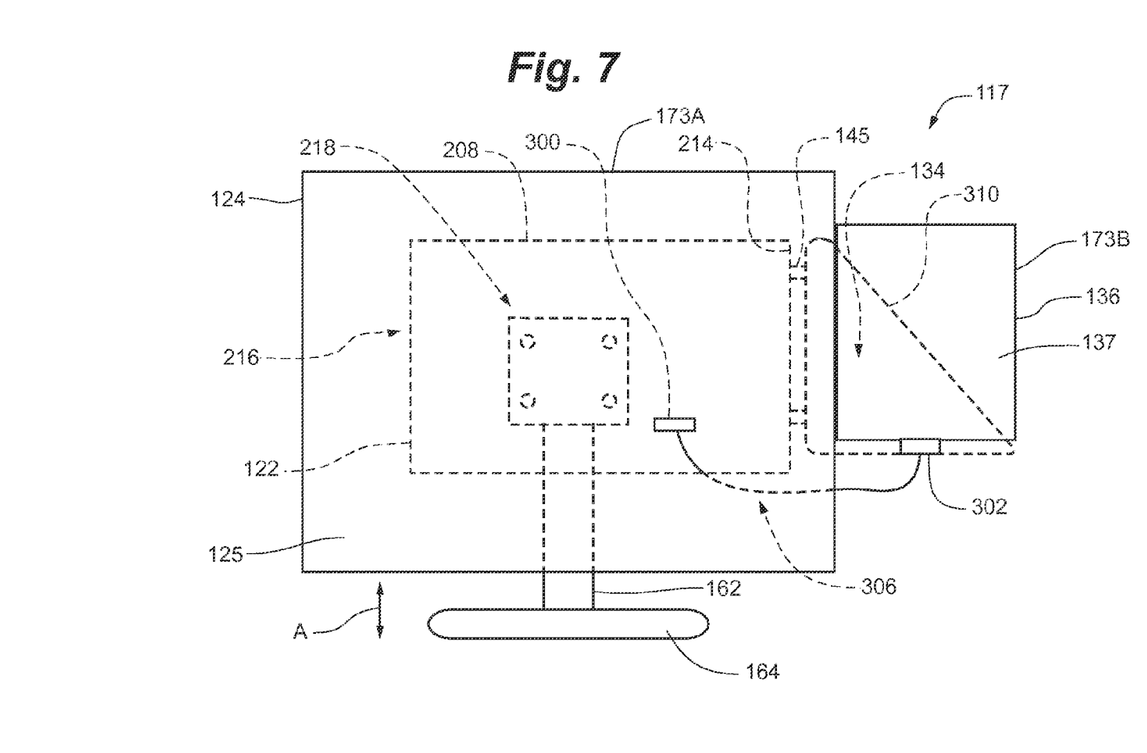
FIG. 7 is a front elevation view of a tablet and monitor stand with a docked tablet and a supported monitor with partially hidden views in accordance with an embodiment.

FIG. 7 depicts a front elevation view of tablet and monitor stand 117, in accordance with some embodiments. Tablet and monitor stand 117 can include a vertical riser 162, a monitor support portion 122 and a tablet support portion 134. The monitor support portion 122 can have a side portion 214 extending along a perimeter 208 between a front portion 216 and a rear portion 218. The monitor support portion 122 front portion 216 can be configured to support a monitor 124, the monitor support portion rear portion 218 can be attached to the vertical riser 162 and the monitor support portion side portion 214 can be attached to a tablet support portion 134 (e.g., pivotally attached via one or more hinges 145). In some embodiments, the screen 125 of a supported monitor is parallel to and facing the same direction as the screen 137 of a supported tablet. As shown, the screens can reside in the same generally vertical plane. In certain embodiments, one or more hinges 145 allow for pivoting so the tablet screen 137 can be positioned parallel to and facing the opposite direction of the monitor screen 125, and any in between (e.g., perpendicular), as desired.

Figure 8:
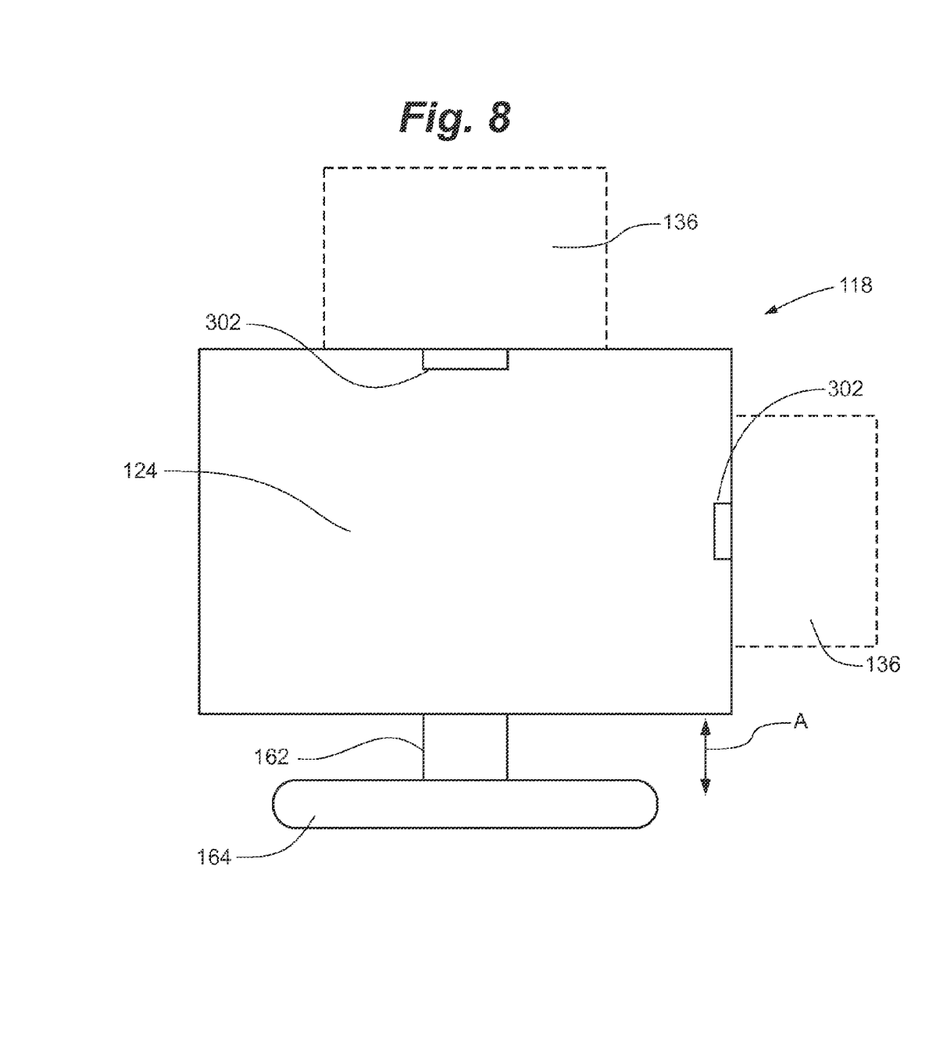
FIG. 8 is a front elevation view of a tablet and monitor stand with a two tablets and a supported monitor with partially hidden views in accordance with an embodiment.

FIG. 8 shows a schematic view of a stand 118 illustrating that stands in accordance with embodiments of the invention can be adapted to support more than one tablet (e.g., two). Any of the monitor and tablet support portions described herein can be utilized. FIG. 8 also demonstrates a tablet can be supported at any desired location with respect to the monitor.

It should be noted that many of the embodiments described herein can optionally be provided with a tilt mechanism to adjust the tilt angle of a supported monitor and/or a supported tablet. In some embodiments, the monitor support portion 122 can include a tilt mechanism between it and the support mechanism 145 that allows a supported monitor to tilt about a generally horizontal axis. In some embodiments the tablet support portion 134 can include a tilt mechanism that allows a supported tablet to tilt about a generally horizontal axis. Any type of tilt mechanism can be utilized.

For embodiments depicted in FIGS. 4A-8, a base 164, that can be configured to rest on a horizontal surface, is shown to provide to support the vertical riser 162. In some embodiments, tablet and monitor stands can also be supported by other support objects or stands, for example, a laptop stand or to a sit-stand workstation. In turn, support objects can, for example, rest on a desk or other work surface, attached to a mobile cart or to a wall, or they can be clamped to a desk or counter.

It should be noted for the embodiments depicted in FIGS. 4A-8 can also be provided with a height adjustment mechanism to adjust the height of the monitor support portion 122 and/or the tablet support portion 134 relative to the base 164 generally along the path of arrow A. Any type of height adjustment mechanism can be utilized.

As disclosed herein, a tablet and monitor stand can be made from many suitable materials. Typically, suitable materials include many rigid or semi-rigid materials, or a combination of materials and construction details to achieve a rigid or semi-rigid stand. Examples of such materials can include plastics, metals or composite materials, which can include, for example, fiberglass or carbon fiber composites.

As outlined above, a tablet and monitor stand can also facilitate sharing text, moving video and/or pictures etc. (collectively: images) that are displayed, or that can be displayed, on a tablet's screen to an external monitor, according to some embodiments. Some tablets have the ability to extend their displays, such that the images displayed on an external monitor are different from those displayed on the tablet's screen. Some tablets have the ability to duplicate their displays, such that the images displayed on an external monitor are the same as those displayed on the tablet's screen (taking into account any difference in aspect ratios between the tablet's screen and that of the monitor). Some tablets have the ability to alternate from extending their displays to duplicating their displays. In some embodiments a supported tablet can act as a driver for images displayed on both the tablet's screen and on a supported monitor. In certain embodiments, no other processor is in electrical communication with the monitor. In such embodiments, the tablet is the only driver in communication with the monitor.

Tablets and monitors can share display images by making use of one or more video signals in accordance with conventional standards, which can be through corresponding ports and mating connectors such as monitor connector 300 and tablet connector 302. Thus, a tablet can have, for example an HDMI, D-Sub, DVI-D, VGA and/or proprietary port(s) that can be used for video output. Of course, not every tablet will have all the ports listed; and typically a tablet may only have one video port, or a tablet may have a proprietary port that provides combined connective functionality which may be equivalent to one or more of the listed ports.

Thus, sharing display images can be as simple as connecting one end of a wire 306 to a tablet's video out port and connecting the other end to a monitor's video in port in order to establish video communication between the tablet and the monitor, provided that the cable is configured with the appropriate connector type, in accordance with the tablet and monitor in use. In embodiments where the monitor or monitor support portion include the tablet support portion and in embodiment where the tablet support portion is integral with the monitor support portion or the monitor, such as shown in FIGS. 5A and B, monitor connector 300 and tablet connector can align and directly connect (optionally via an integrated docking station) such that a separate wire is not used in the connection.

In some embodiments, one or both connectors can interact with a port in a docking station 310 associated with a monitor or tablet, rather than engaging directly with the monitor or tablet. FIGS. 1 and 7 refer to a docking station 310, but a docking station is not required in those embodiments. Further, a docking station can be provided in any of the embodiments described herein. In some embodiments, the docking station can be configured to align the monitor or tablet, as it is positioned in the docking station, such that the port in the monitor or tablet aligns with, and connects to, the connector. Any of the embodiments described herein may include a docking station associated with the monitor support portion 122 and/or the tablet support portion 134. The wire 306 can have a monitor connector 300 and a tablet connector 302 which can be configured to connect with ports on a docking station for a monitor and/or tablet 136.

For some embodiments, access to a tablet's video out port may be obstructed due to structure used to support the tablet. Thus, in some embodiments, a connector opening can be provided. As shown in FIGS. 1, 3A and 3B, a connector opening 316 can be provided in the sill portion 154, such that a connector can pass through the connector opening 316 and connect with a corresponding port on a tablet 136. In some embodiments, a connector opening can additionally provide supplementary support for a tablet. The connector opening can be configured with a tight tolerance, such that a connector is still permitted to connect with a port on the tablet, while at the same time, the connector, by virtue of a limited gap within the connector opening can cooperate with the tablet support portion to support the tablet.

In the foregoing detailed description, the invention has been described with reference to specific embodiments. However, it may be appreciated that various modifications and changes can be made without departing from the scope of the invention as set forth in the appended claims.

What is claimed is:

1. A monitor support comprising:
a front portion and a rear portion, the monitor support front portion configured to support a monitor, the monitor support rear portion configured to attach to a support structure, and
a top portion having a top edge, the top edge having a length, the top portion defining a recessed region that extends along at least a portion of the length of the top edge, the recessed region defining a mobile computing device support portion that is configured to receive and releasably support an edge of a mobile computing device, wherein the mobile computing device support portion is positioned behind the supported monitor, and wherein the mobile computing device support portion supports the mobile computing device behind a rear portion of the supported monitor.

2. The monitor support of claim 1, wherein the mobile computing device is a tablet computer.

3. The monitor support of claim 1, wherein the mobile computing device is a cellular phone.

4. The monitor support of claim 1, wherein the monitor support and mobile computing device support portion are positioned such that a perimeter of a supported monitor overlaps with a perimeter of a supported mobile computing device in front plan view.

5. The monitor support of claim 1, wherein the monitor support and mobile computing device support portion are positioned such that a perimeter of a supported monitor does not overlap with a perimeter of a supported mobile computing device in front plan view.

6. The monitor support of claim 1, wherein the front portion includes a support arrangement.

7. The monitor support of claim 1, wherein the support arrangement is a VESA mount.

8. The monitor support of claim 1, further comprising an electrical connection that has a first connector and a second connector, the first connector configured to connect with a port on a supported mobile computing device, the second connector configured to connect to the supported monitor, such that a connected mobile computing device and a connected monitor are configured to be in electronic communication.

9. The monitor support of claim 1, wherein the mobile computing device support portion further comprises a docking station that releasably supports the mobile computing device, the docking station having the first connector, the docking station configured to align the mobile computing device, as the mobile computing device is positioned in the docking station, such that the port in the mobile computing device aligns with, and connects to, the first connector.

10. The monitor support of claim 1, further comprising a base configured to rest on a horizontal surface, wherein the base supports the support structure.

11. The monitor support of claim 1, wherein a screen of the supported monitor is parallel to and facing the same direction as a screen of a supported mobile computing device.

12. The monitor support of claim 1, wherein a screen of the supported monitor is parallel to and facing the opposite direction as a screen of a supported mobile computing device.

13. The monitor support of claim 1, wherein the mobile computing device support portion is integral with the monitor support or the monitor.

14. The monitor support of claim 1, further comprising a tilt mechanism.

15. The monitor support of claim 1, wherein the support structure is a vertical riser.

16. The monitor support of claim 1, wherein the support structure includes a height adjustment mechanism.

17. A monitor support comprising:
a front portion and a rear portion, the monitor support front portion configured to support a monitor, the monitor support rear portion configured to attach to a support structure; and
a top portion having a top edge, the top edge having a length, the top portion defining a recessed region that extends along at least a portion of the length of the top edge, the recessed region defining a tablet support portion that is configured to receive and releasably support an edge of a tablet, wherein the tablet support portion is positioned behind the supported monitor, and wherein the tablet support portion supports the tablet behind a rear portion of the supported monitor.

18. The monitor support of claim 17, wherein the monitor support and tablet support portion are positioned such that a perimeter of a supported monitor overlaps with a perimeter of a supported tablet in front plan view.

19. The monitor support of claim 17, wherein the monitor support and tablet support portion are positioned such that a perimeter of a supported monitor does not overlap with a perimeter of a supported tablet in front plan view.

20. The monitor support of claim 17, further comprising an electrical connection that has a first connector and a second connector, the first connector configured to connect with a port on a supported mobile computing device, the second connector configured to connect to the supported monitor, such that a connected mobile computing device and a connected monitor are configured to be in electronic communication.

* * * * *

UNITED STATES PATENT AND TRADEMARK OFFICE
CERTIFICATE OF CORRECTION

PATENT NO. : 9,660,466 B2
APPLICATION NO. : 14/921499
DATED : May 23, 2017
INVENTOR(S) : Ergun et al.

Page 1 of 1

It is certified that error appears in the above-identified patent and that said Letters Patent is hereby corrected as shown below:

On the Title Page

On page 3, in Column 2, under "Other Publications", Line 17, delete "Jul. 28, 2015" and insert --Jul. 28, 2014-- therefor On page 3, in Column 2, under "Other Publications", Line 18, delete "Jun. 26, 2015"," and insert --Jun. 26, 2014",-- therefor In the Claims In Column 9, Line 67, in Claim 1, delete "structure," and insert --structure;-- therefor In Column 10, Line 29, in Claim 7, delete "claim 1," and insert --claim 6,-- therefor In Column 10, Line 40, in Claim 9, delete "claim 1," and insert --claim 8,-- therefor Signed and Sealed this
Nineteenth Day of June, 2018

Andrei Iancu
*Director of the United States Patent and Trademark Office*